(12) United States Patent
Huang et al.

(10) Patent No.: US 12,236,696 B2
(45) Date of Patent: Feb. 25, 2025

(54) METHOD AND APPARATUS FOR RECOGNIZING SUBTITLE REGION, DEVICE, AND STORAGE MEDIUM

(71) Applicant: Tencent Technology (Shenzhen) Company Limited, Shenzhen (CN)

(72) Inventors: Jie Huang, Shenzhen (CN); Shupei Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 396 days.

(21) Appl. No.: 17/960,004

(22) Filed: Oct. 4, 2022

(65) Prior Publication Data
US 2023/0027412 A1    Jan. 26, 2023

Related U.S. Application Data

(63) Continuation of application No. PCT/CN2021/122697, filed on Oct. 8, 2021.

(30) Foreign Application Priority Data

Oct. 27, 2020   (CN) .......................... 202011165751.0

(51) Int. Cl.
    *G06V 30/146* (2022.01)
    *G10L 15/02* (2006.01)
(52) U.S. Cl.
    CPC ............ *G06V 30/147* (2022.01); *G10L 15/02* (2013.01)
(58) Field of Classification Search
    CPC .............................. G06V 30/147; G10L 15/02
    (Continued)

(56) References Cited

U.S. PATENT DOCUMENTS

2007/0116360 A1*  5/2007  Jung .................... G06V 30/147
                                                       382/176
2008/0143880 A1   6/2008  Jung et al.
                    (Continued)

FOREIGN PATENT DOCUMENTS

CN           101887439 A      11/2010
CN           103546667 A       1/2014
                 (Continued)

OTHER PUBLICATIONS

Tencent Technology, ISR, PCT/CN2021/122697, Jan. 6, 2022, 2 pgs.
Tencent Technology, WO, PCT/CN2021/122697, Jan. 6, 2022, 5 pgs.
Tencent Technology, IPRP, PCT/CN2021/122697, May 2, 2023, 6 pgs.

*Primary Examiner* — Allen H Nguyen
(74) *Attorney, Agent, or Firm* — Morgan, Lewis & Bockius LLP

(57) ABSTRACT

A method and an apparatus for recognizing a subtitle region, a device, and a storage medium are provided, relating to the field of computer vision technologies of artificial intelligence. The method includes: recognizing a video to obtain n candidate subtitle regions, the candidate subtitle regions being regions in which text contents are displayed in the video, and n being a positive integer; and screening the n candidate subtitle regions according to a subtitle region screening policy to obtain the subtitle region, the subtitle region screening policy being used for determining a candidate subtitle region in which text contents have a repetition rate being lower than a repetition rate threshold and have a longest total display duration as the subtitle region. By using the method and apparatus, device, and system, labor resources required for subtitle region recognition can be saved.

20 Claims, 8 Drawing Sheets

(58) Field of Classification Search
USPC .......................................................... 382/176
See application file for complete search history.

(56) References Cited

U.S. PATENT DOCUMENTS

2012/0206567 A1* 8/2012 Zafarifar ................ H04N 7/025
                  348/E13.001
2019/0349641 A1* 11/2019 Choi ....................... G10L 15/02

FOREIGN PATENT DOCUMENTS

| CN | 110197177 A | 9/2019 |
| CN | 112232260 A | 1/2021 |

* cited by examiner

METHOD AND APPARATUS FOR RECOGNIZING SUBTITLE REGION, DEVICE, AND STORAGE MEDIUM

CROSS-REFERENCE TO RELATED APPLICATIONS

This application is a continuation application of PCT Patent Application No. PCT/CN2021/122697, entitled "CAPTION AREA IDENTIFICATION METHOD AND APPARATUS, AND DEVICE AND STORAGE MEDIUM" filed on Oct. 8, 2021, which claims priority to Chinese Patent Application No. 202011165751.0, filed with the State Intellectual Property Office of the People's Republic of China on Oct. 27, 2020, and entitled "METHOD AND APPARATUS FOR RECOGNIZING SUBTITLE REGION, DEVICE, AND STORAGE MEDIUM", all of which are incorporated herein by reference in their entirety.

FIELD OF THE TECHNOLOGY

This application relates to the field of computer vision technologies of artificial intelligence, and in particular, to a method and an apparatus for recognizing a subtitle region, a device, and a storage medium.

BACKGROUND OF THE DISCLOSURE

With the popularity of short videos, subtitle extraction technologies need to be applied to videos in various scenarios. For example, in a training process of a speech-to-text model, subtitles in videos need to be used as training samples.

In the related art, text information in a short video is not necessarily subtitled texts, but brand watermark texts, video title texts, and the like, may also be included. Therefore, for the extraction of a subtitle in a short video, a subtitle region is manually marked, and then the optical character recognition (OCR) technology is used to perform text recognition on a marked position to obtain the subtitle. For example, a screenshot of a video is manually taken, then an image viewing software is used to open the screenshot, a mouse is moved to an upper left corner and a lower right corner of a subtitle, coordinates of two positions can be obtained, and then a position of the subtitle is obtained.

In a method in the related art, a lot of labors are required to extract subtitles.

SUMMARY

Embodiments of this application provide a method and an apparatus for recognizing a subtitle region, a device, and a storage medium, which can automatically perform subtitle extraction and save labor resources. The technical solutions are as follows:

According to one aspect of this application, provided is a method for recognizing a subtitle region, performed by a computer device, the method including:
obtaining n candidate subtitle regions in a video, the candidate subtitle regions being regions in which text contents are displayed in the video, and n being a positive integer; and
screening the n candidate subtitle regions according to a subtitle region screening policy to obtain the subtitle region, the subtitle region screening policy being used for determining a candidate subtitle region in which text contents have a repetition rate being lower than a repetition rate threshold and have a longest total display duration as the subtitle region.

According to another aspect of this application, provided is an apparatus for recognizing a subtitle region, including:
a recognition module, configured to obtain n candidate subtitle regions in a video, the candidate subtitle regions being regions in which text contents are displayed in the video, and n being a positive integer; and
a screening module, configured to screen the n candidate subtitle regions according to a subtitle region screening policy to obtain the subtitle region, the subtitle region screening policy being used for determining a candidate subtitle region in which text contents have a repetition rate being lower than a repetition rate threshold and have a longest total display duration as the subtitle region.

According to another aspect of this application, provided is a computing device, including: a processor and a memory storing at least one instruction, at least one program, a code set, or an instruction set, the at least one instruction, the at least one program, the code set, or the instruction set being loaded and executed by the processor to implement the method for recognizing a subtitle region according to the foregoing aspects.

According to another aspect of this application, provided is a non-transitory computer-readable storage medium, storing at least one instruction, at least one program, a code set, or an instruction set, the at least one instruction, the at least one program, the code set, or the instruction set being loaded and executed by a processor to implement the method for recognizing a subtitle region according to the foregoing aspects.

According to another aspect of the embodiments of the present application, provided is a computer program product or a computer program, including computer instructions, the computer instructions being stored in a computer-readable storage medium. A processor of a computer device reads the computer instructions from the computer-readable storage medium, and executes the computer instructions, to cause the computer device to perform the method for recognizing a subtitle region provided in the foregoing implementations.

The technical solutions provided in the embodiments of this application achieve at least the following beneficial effects:

A subtitle region is obtained by screening candidate subtitle regions recognized from a video by using a subtitle region screening policy. According to characteristics of a fixed display position, diverse text contents, and a relatively long display duration of a subtitle, the subtitle region is selected from the candidate subtitle regions. Therefore, a subtitle of the video can be extracted according to the subtitle region. Compared with a method of manually marking the subtitle region, this method saves labor resources required for subtitle recognition and improves the speed and efficiency of the subtitle recognition.

DESCRIPTION OF EMBODIMENTS

Figure 1:
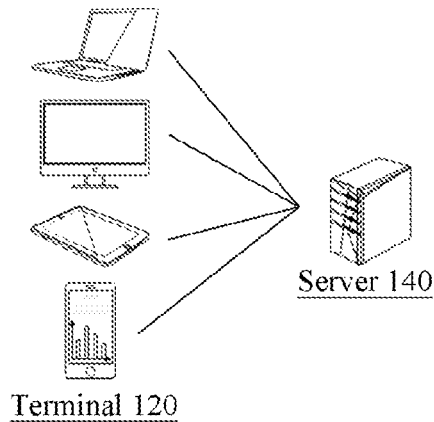
FIG. 1 is a block diagram of a computer system according to an exemplary embodiment of this application.

To make the objectives, technical solutions, and advantages of this application clearer, the following further describes the implementations of this application in detail with reference to the accompanying drawings.

First, several terms described in the embodiments of this application are briefly introduced.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and electromechanical integration. AI software technologies mainly include a computer vision technology (CV), a speech processing technology, a natural language processing (NLP) technology, machine learning (ML)/deep learning, and the like.

The CV technology is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, computer vision deals with related theories and technologies in an attempt to create an artificial intelligence system capable of obtaining information from images or multidimensional data. The CV technology generally includes technologies such as image processing, image recognition, image semantic understanding, image retrieval, optical character recognition (OCR), video processing, video semantic understanding, video content/behavior recognition, three-dimensional object reconstruction, a three-dimensional (3D) technology, virtual reality (VR), augmented reality (AR), synchronous positioning, and map construction, and further include biological feature recognition technologies such as common face recognition and fingerprint recognition.

OCR is an abbreviation of Optical Character Recognition, which means recognition of optical characters, or is simply referred to as text recognition, and is a method of automatic text input. Through the OCR technology, text and image information on a paper are obtained through optical input methods such as scanning and photography, recognition algorithms in various patterns are used to analyze morphological characteristics of characters, which can convert bills, newspapers, books, manuscripts, and other printed materials into image information, and then a text recognition technology is used to convert image information into computer input that can be used.

FIG. 1 shows a schematic structural diagram of a computer system according to an exemplary embodiment of this application. The computer system includes a terminal 120 and a server 140.

The terminal 120 is connected to the server 140 through a wired or wireless network.

The terminal 120 includes at least one of a smartphone, a notebook computer, a desktop computer, a tablet computer, a smart speaker, and a smart robot. In an implementation, the terminal uploads a video on which subtitle recognition needs to be performed to the server, and the server performs subtitle recognition on the video uploaded by the terminal. In another implementation, the server may also perform subtitle recognition on a locally stored video. In another implementation, the terminal may also perform subtitle recognition on a locally stored video. In another implementation, the terminal may also download a video through a network, and perform subtitle recognition on the downloaded video.

Exemplarily, the terminal 120 further includes a display; and the display is configured to display a screen of a video.

The terminal 120 includes a first memory and a first processor. A first program is stored in the first memory; and the first program described above is called and executed by the first processor to implement the method for recognizing a subtitle region provided in this application. The first memory may include but is not limited to the following: a random access memory (RAM), a read only memory (ROM), a programmable read-only memory (PROM), an erasable programmable read-only memory (EPROM), and an electrically erasable programmable read-only memory (EEPROM).

The first processor may include one or more integrated circuit chips. In some embodiments, the first processor may be a central processing unit (CPU), or a network processor (NP). In some embodiments, the first processor may implement the method for recognizing a subtitle region provided in this application by invoking a subtitle recognition algorithm.

The server 140 includes a second memory and a second processor. A second program is stored in the second memory, and the second program is called by the second processor to implement the method for recognizing a subtitle region provided in this application. Exemplarily, a subtitle recognition algorithm is stored in the second memory. In an implementation, the server receives a video transmitted by the terminal, and performs subtitle recognition by using the subtitle recognition algorithm. In some embodiments, the second memory may include but is not limited to the following: RAM, ROM, PROM, EPROM, and EEPROM. In some embodiments, the second processor may be a general-purpose processor, such as a CPU or an NP.

The server 140 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

Exemplarily, the method for recognizing a subtitle region provided in this application may be applied to scenarios such as video subtitle extraction, the obtaining of training samples of a speech-to-text model, and the like. For example, training samples of a speech-to-text model are obtained by using the method for recognizing a subtitle region provided in this application. After a subtitle region of a video is obtained, text regions belonging to the subtitle region and text data corresponding to the text regions are obtained, text contents in the text data are a text part of the training samples, an audio with corresponding duration is captured from the video according to a display duration (start time and end time) in the text data, the audio is a speech part of the training samples, and the text part and the voice part are correspondingly stored as the training samples.

Figure 2:
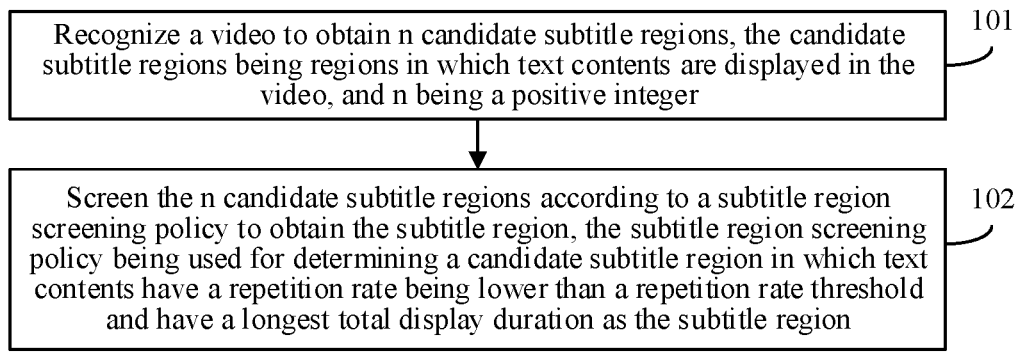
FIG. 2 is a method flowchart of a method for recognizing a subtitle region according to another exemplary embodiment of this application.

FIG. 2 shows a method flowchart of a method for recognizing a subtitle region according to an exemplary embodiment of this application. The method may be performed by a computer device, for example, a terminal or a server as shown in FIG. 1. The method includes the following steps.

Step 101: Recognize a video to obtain n candidate subtitle regions, the candidate subtitle regions being regions in which text contents are displayed in the video, and n being a positive integer.

Exemplarily, the video may be a video file of any type, for example, a short video, a TV series, a movie, a variety show, or the like. Exemplarily, a subtitle is included in the video. Taking a short video as an example, texts in a short video screen not only includes a subtitle, but may also include other text information, such as a watermark text of a short video application, a user nickname of a short video publisher, a video name of the short video, and the like. Therefore, a subtitle of a short video cannot be accurately obtained simply by using the OCR technology for text recognition. In addition, a lot of labors are required to manually mark a subtitle region and then perform text recognition on a marked position to obtain the subtitle. Therefore, this application provides a method for recognizing a subtitle, which can accurately recognize the subtitle from a plurality of text information in a video, omit the step of manually marking a subtitle region, and improve the efficiency of subtitle extraction.

Exemplarily, the method for obtaining a video may be arbitrary, and the video may be a video file locally stored by a computer device, or may be a video file obtained by another computer device. For example, when the computer device is a server, the server may receive a video file uploaded by a terminal; and when the computer device is a terminal, the terminal may also download a video file stored on a server through a network. For example, the computer device is a server, a client with a font extraction function may be installed on a terminal, a user may select a locally stored video file on a user interface of the client, and click an upload control to upload the video file to the server, and the server performs subsequent processing of subtitle region recognition on the video file.

A candidate subtitle region refers to a region in a video in which text contents are displayed. Exemplarily, the candidate subtitle region includes a region in which text contents are displayed in each frame of a video screen in the video. The candidate subtitle region is a type of region position with a clear region range and position coordinates. Exemplarily, text regions in which text contents with similar positions in the video are located are clustered into a candidate subtitle region.

Step 102: Screen the n candidate subtitle regions according to a subtitle region screening policy to obtain the subtitle region, the subtitle region screening policy being used for determining a candidate subtitle region in which text contents have a repetition rate being lower than a repetition rate threshold and have a longest total display duration as the subtitle region.

Exemplarily, based on characteristics that text contents displayed in a subtitle region are diverse and the text contents are displayed in the subtitle region for a long time, from a plurality of candidate subtitle regions, a candidate subtitle region in which text contents have a repetition rate being lower than a repetition rate threshold and are displayed for a long time is determined as a subtitle region.

The repetition rate of text contents is high, that is, a variety of text contents are displayed in the candidate subtitle region, and the repetition rate of text contents is low, that is, only one or several types of text contents are displayed in the candidate subtitle region.

The total display duration refers to a total duration of text contents displayed in a candidate subtitle region. Because a subtitle is usually displayed for a long time in a video, a candidate subtitle region with text contents displayed for a long time is selected as a subtitle region.

In summary, in the method provided in this embodiment, a subtitle region is obtained by screening candidate subtitle regions recognized from a video by using a subtitle region screening policy. According to characteristics of a fixed display position, diverse text contents, and a relatively long display duration of a subtitle, the subtitle region is selected from the candidate subtitle regions. Therefore, a subtitle of the video can be extracted according to the subtitle region. Compared with a method of manually marking the subtitle region, this method saves labor resources required for subtitle recognition and improves the speed and efficiency of the subtitle recognition.

Figure 3:
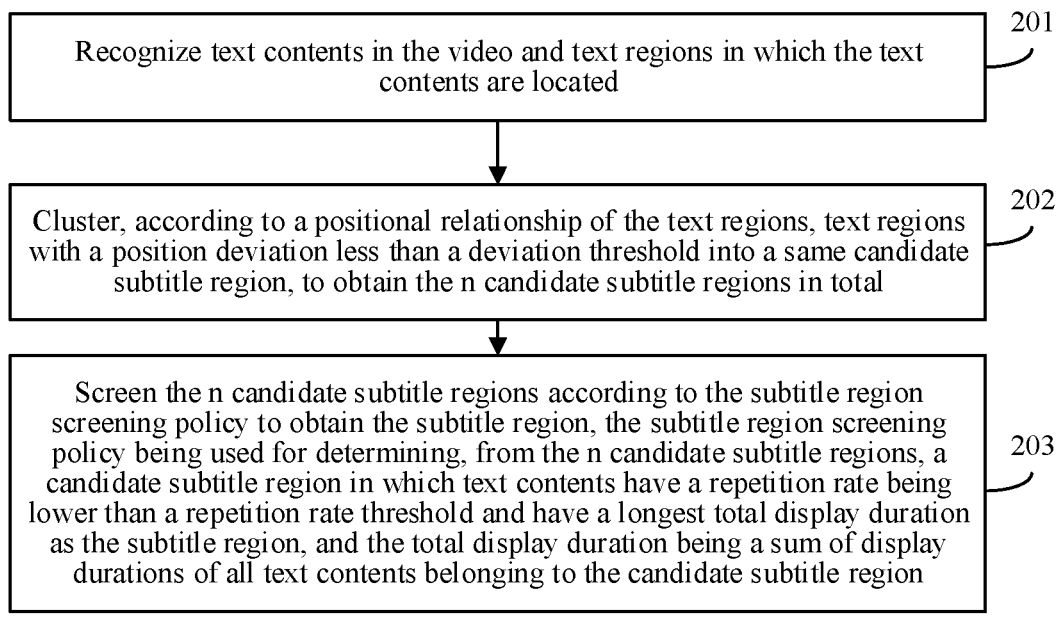
FIG. 3 is a method flowchart of a method for recognizing a subtitle region according to an exemplary embodiment of this application.

FIG. 3 shows a method flowchart of a method for recognizing a subtitle region according to an exemplary embodiment of this application. The method may be performed by a computer device, for example, a terminal or a server as shown in FIG. 1. The method includes the following steps.

Step 201: Recognize text contents in the video and text regions in which the text contents are located.

Exemplarily, the text contents in the video, the text regions in which the text contents are located, and display durations of the text contents are recognized. There is a correspondence between the text contents, the text regions, and the display durations.

Exemplarily, texts in a video are recognized to obtain a text list, the text list includes at least one piece of text data, the text data includes text contents, text regions, and display durations, and the text contents includes at least one text located in the text regions.

Exemplarily, the computer device performs text recognition on the video to obtain the text list. Exemplarily, the text list may be a data table, in which each row represents a piece of text data, and each column includes a specific content of the text data: the text contents, the text regions, and the display durations. For a video frame image of a video, different regions on the image may include different text contents. For a plurality of video frame images of the video, same regions on the images may also display different text contents at different times. Therefore, by extracting a plurality of text contents in different text regions and with different display times in the video, a plurality of pieces of text data can be obtained to form a text list. Exemplarily, when same text contents are displayed in same text regions in different time periods, the two text contents belong to two pieces of text data respectively. That is, when same text contents are displayed in same text regions on continuous video frame images, the text contents belong to a piece of text data, and a lasting duration of the continuous video frame images is the display duration (the display duration of the text contents) in the text data. For example, a first text content is displayed in a first region on a video frame image of 1-3 s, texts are not displayed in the first region on a video frame image of 3-4 s, and the first text content is displayed in the first region on a video frame image of 4-5 s, then the two first text contents correspond to two pieces of text data respectively, and display durations of the two pieces of text data are 2 s and 1 s respectively.

Exemplarily, by performing text recognition on an image of each frame of a video, recognized text contents, position coordinates of the text contents on the image, and time information of the frame are obtained. Information obtained by performing text recognition on a plurality of frame images described above is organized and integrated, to obtain a text list. For example, a text content 1 and a text content 2 are recognized on a first frame of a video, the text content 1 is located at a position 1 on the first frame, the text content 2 is located at a position 2 on the first frame, and a time of the first frame in the video is 00:01; and the text content 1 and a text content 3 are recognized on a second frame of the video, the text content 1 is located at the position 1 on the second frame, the text content 3 is located at a position 3 on the second frame, and a time of the second frame in the video is 00:05. Therefore, by integrating information recognized in the two frames, a text list including three pieces of text data can be obtained. The first piece of text data: the text content 1, the position 1, and 4 minutes from 00:01 to 00:05; the second piece of text data: the text content 2, the position 2, and 00: 01; and the third piece of text data: the text content 3, the position 3, and 00: 05.

Exemplarily, the text list may also be a data set, a database, a document file, or the like, including a plurality of pieces of text data.

Exemplarily, the text region includes a position of a text box used for framing texts. Exemplarily, the text box is a rectangular box, and the position of the text box may be represented by positions of four lines (upper edge, lower edge, left edge, and right edge), coordinates of four vertices of the text box, or coordinates of two vertices at diagonally opposite corners of the text box.

Step 202: Cluster, according to a positional relationship of the text regions, text regions with a position deviation less than a deviation threshold into a same candidate subtitle region, to obtain the n candidate subtitle regions in total.

Exemplarily, the text regions are grouped into the n candidate subtitle regions, a position deviation between a text region belonging to an $i^{th}$ candidate subtitle region and the $i^{th}$ candidate subtitle region is less than the deviation threshold, n is a positive integer, and i is a positive integer less than or equal to n.

Exemplarily, clustering/grouping refers to classifying text regions according to a position distribution of the text regions, and classifying a plurality of text regions with a position deviation less than a deviation threshold into a text region of a same type, that is, a same candidate subtitle region.

Figure 4:
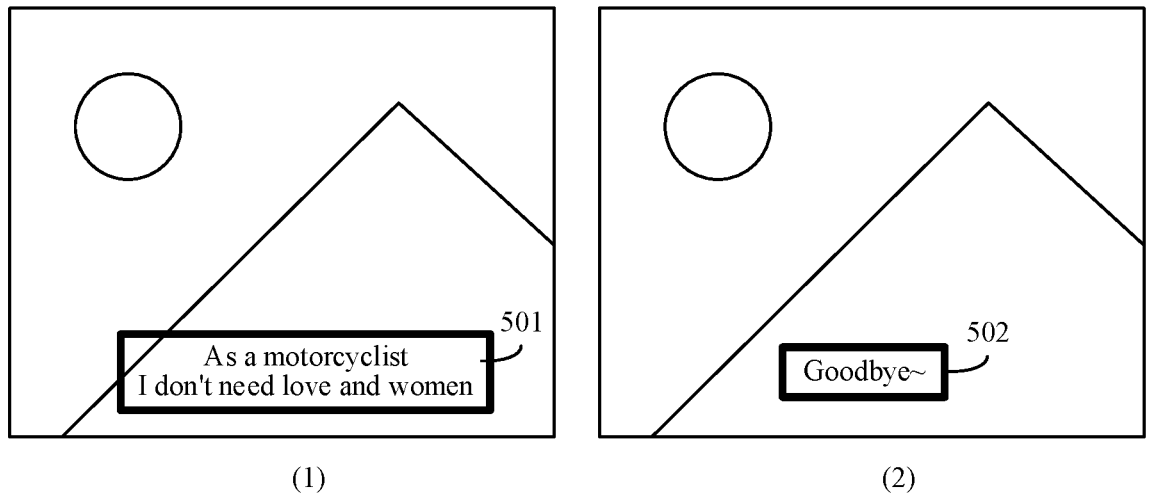
FIG. 4 is a schematic diagram of a video frame image in a method for recognizing a subtitle region according to another exemplary embodiment of this application.

Exemplarily, after a text list is obtained, the text list includes a plurality of text regions. Because a subtitle of a video is usually displayed in a same region, the text regions are grouped to obtain a plurality of candidate subtitle regions. Exemplarily, due to text contents of different subtitles are different, ranges of displayed regions may be slightly different. For example, (1) and (2) in FIG. 4 are respectively two video frame images of a video, on the two video frame images, there are a first text content located in a first text region 501 and a second text content located in a second text region 502, and both the text contents are subtitles. However, due to a difference in quantities of words and lines of the text contents, the text regions of the two text contents are slightly different. However, both the text regions are subtitle regions. Therefore, a deviation threshold needs to be set when grouping candidate subtitle regions. When position deviations of the two text regions are less than the deviation threshold, the two text regions are considered to belong to a same candidate subtitle region. In this way, a plurality of text regions in a text list can be grouped, and finally several candidate subtitle regions can be obtained.

Exemplarily, for example, a position deviation between the first text region and the second text region is calculated. The first text region includes a first upper edge, a first lower edge, a first left edge, and a first right edge, and the second text region includes a second upper edge, a second lower edge, a second left edge, and a second right edge. The position deviation includes: at least one of a deviation between the first upper edge and the second upper edge, a deviation between the first lower edge and the second lower edge, a deviation between the first left edge and the second left edge, and a deviation between the first right edge and the second right edge. Exemplarily, because a subtitle is usually horizontally displayed subtitle, then, due to a difference in quantities of words in text contents, a position difference of text regions in a left and right direction is relatively large, and a position difference in an up and down direction is relatively small. Therefore, a position deviation may include a deviation between two upper edges and a deviation between two lower edges of two text regions, that is, text regions with similar longitudinal positions are classified into a same candidate subtitle region. Exemplarily, because some subtitles are vertically displayed subtitles, a position deviation may also include a deviation between two left edges and a deviation between two right edges of two text regions, that is, text regions with similar horizontal positions are classified into a same candidate subtitle region.

Exemplarily, a specific value of the deviation threshold may be arbitrary. Exemplarily, after repeated trials, it is found that the deviation threshold is preferably 30 pixels to 50 pixels. For example, when the deviation threshold is set to 40 pixels, two text regions with a deviation between two upper edges of the two text regions less than 40 pixels and a deviation between two lower edges also less than 40 pixels are classified into a same candidate subtitle region.

Exemplarily, the candidate subtitle region has a region position, that is, at which the candidate subtitle region is located. Exemplarily, the region position of the candidate subtitle region is a largest text region belonging to the candidate subtitle region. Exemplarily, the region position of the candidate subtitle region is a text region with a largest height (corresponding to a horizontally displayed subtitle) belonging to the candidate subtitle region, or the region position of the candidate subtitle region is a text region with a largest width (corresponding to a vertically displayed subtitle) belonging to the candidate subtitle region.

Exemplarily, after text regions are grouped into a plurality of candidate subtitle regions, a column of data of the candidate subtitle regions may be added to a text list, and then each piece of text data is added with the data of the candidate subtitle regions. Therefore, each text content corresponds to a text region, corresponds to a display duration, and corresponds to a candidate subtitle region.

Step 203: Screen the n candidate subtitle regions according to the subtitle region screening policy to obtain the subtitle region; the subtitle region screening policy being used for determining, from the n candidate subtitle regions, a candidate subtitle region in which text contents have a repetition rate being lower than a repetition rate threshold and have a longest total display duration as the subtitle region, and the total display duration being a sum of display durations of all text contents belonging to the candidate subtitle region.

Exemplarily, the total display duration is a sum of display durations of all text contents belonging to a candidate subtitle region.

Exemplarily, after obtaining candidate subtitle regions, a computer device may invoke an algorithm of the subtitle region screening policy to recognize a subtitle region of a video from the candidate subtitle regions. Exemplarily, because some interference texts (non-subtitle texts), including a video title, an application watermark, a user nickname, and the like, may appear in a video, and the interference texts have characteristics of long display durations and unchanged displayed words, a subtitle region may be screened from text data according to the characteristics of the interference texts.

Exemplarily, the subtitle region screening policy is set according to display characteristics of interference texts and display characteristics of a subtitle. The subtitle has characteristics of a long display duration, a fixed position, and diverse text contents. However, the interference texts have other characteristics, for example, a watermark has characteristics of a long display duration, a fixed position, and an unchanged text content; a video title has characteristics of a short display duration, a fixed position, and an unchanged text content; and based on different characteristics of the subtitle and the interference texts, a subtitle region in which the subtitle is located can be screened from the candidate subtitle regions.

Figure 5:
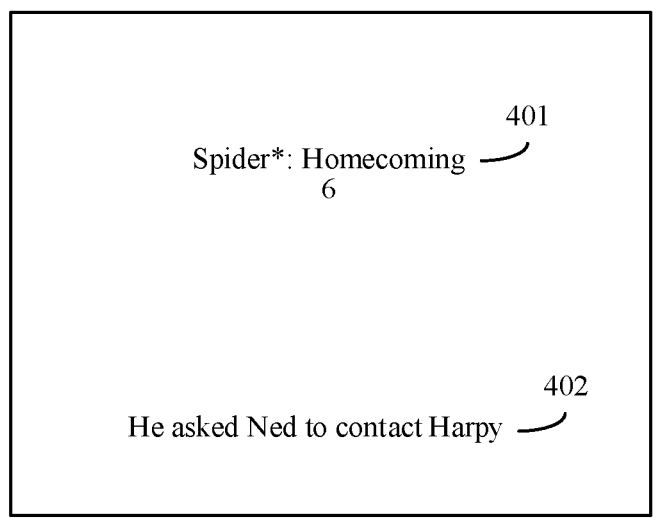
FIG. 5 is a schematic diagram of a video frame image in a method for recognizing a subtitle region according to another exemplary embodiment of this application.

In the subtitle region screening policy provided in this application, whether an unchanged text content is displayed on each candidate subtitle region is first determined, and when there is an unchanged text content, the candidate subtitle region is not the subtitle region. Then, from the remaining candidate subtitle regions, a candidate subtitle region with a longest total display duration is selected as the subtitle region. Some interference texts, for example, title texts of a TV series, are only displayed for first few seconds of a video, and are not displayed later. For example, as shown in FIG. 5, a video title 401 and a subtitle 402 are displayed on a video frame image. The video title 401 disappears after being displayed for a while, no text is displayed at this position, and texts are displayed at a position of the subtitle 402 for a long time. Therefore, the candidate subtitle region with the longest total display duration is selected from the remaining candidate subtitle regions as the subtitle region.

In summary, in the method provided in this embodiment, a subtitle region screening policy is used to screen text regions in a text list recognized from a video to obtain candidate subtitle regions. According to characteristics of a fixed display position, diverse text contents, and a relatively long display duration of a subtitle, a subtitle region is selected from the candidate subtitle regions. Therefore, a subtitle of the video can be extracted according to the subtitle region. Compared with a method of manually marking the subtitle region, this method saves labor resources required for subtitle recognition and improves the speed and efficiency of the subtitle recognition.

Exemplarily, an exemplary embodiment of performing subtitle region screening according to a subtitle region screening policy is provided.

Figure 6:
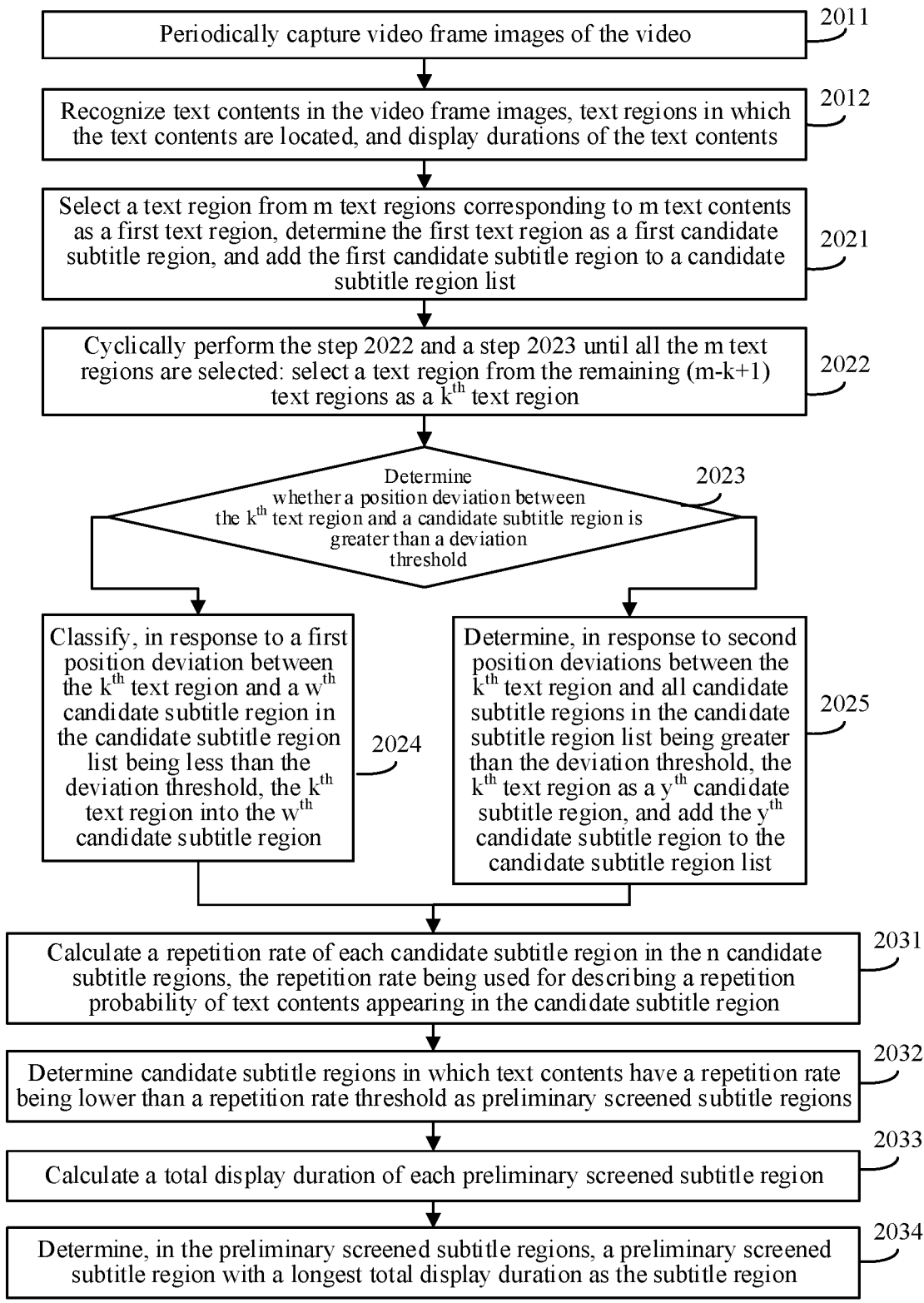
FIG. 6 is a method flowchart of a method for recognizing a subtitle region according to another exemplary embodiment of this application.

FIG. 6 shows a method flowchart of a method for recognizing a subtitle region according to an exemplary embodiment of this application. The method may be performed by a computer device, for example, a terminal or a server as shown in FIG. 1. On the basis of an exemplary embodiment shown in FIG. 3, the step 201 further includes steps 2011 to 2012, the step 202 further includes steps 2021 to 2025, and the step 203 further includes steps 2031 to 2034.

Step 2011: Periodically capture video frame images of the video.

Exemplarily, first, frame capturing processing needs to be performed on the video, and the frame capturing processing is to periodically capture video frame images from the video and store the video frame images sequentially. Exemplarily, a time interval (period) for capturing video frame images from the video may be arbitrary, for example, 2 video frame images are captured every second. Exemplarily, each frame of image of the video may also be captured as a video frame image. Exemplarily, a plurality of frames of video frame images may be captured from a video.

Step 2012: Recognize text contents in the video frame images, text regions in which the text contents are located, and display durations of the text contents.

Exemplarily, a text list is obtained by recognizing texts in the video frame images.

Exemplarily, a computer device performs text recognition on each frame of the video frame images to obtain a text list.

Exemplarily, an OCR model is called to recognize the video frame images, to obtain candidate text contents in the video frame images and text regions in which the candidate text contents are located, and display times of the candidate text contents are obtained according to display times of the video frame images; the candidate text contents are deduplicated to obtain the text contents, where the deduplicating includes determining a candidate text content with an earliest display time from a plurality of candidate text contents with continuous display times, same text regions, and same candidate text contents as the text contents, and calculating the display durations of the text contents according to the display times of the plurality of candidate text contents; and a text list is generated according to the text contents, the text regions of the text contents, and the display durations.

Exemplarily, an OCR model is called to recognize texts in the video frame images, and the OCR model outputs candidate text contents in the video frame images and text regions in which the candidate text contents are located. In this way, a data table including: candidate text contents, text regions, and display times can be obtained.

The display times of the video frame images refers to times when the video frame images are displayed in the video. The display times of the candidate text contents extracted from the video frame images are the same as the display times of the video frame images.

The OCR model is used for performing text recognition on the video frame images, recognizing the texts in the video frame images, and outputting the texts and the text regions. Exemplarily, the OCR model is a neural network model, and any known OCR model may be adopted.

Figure 7:
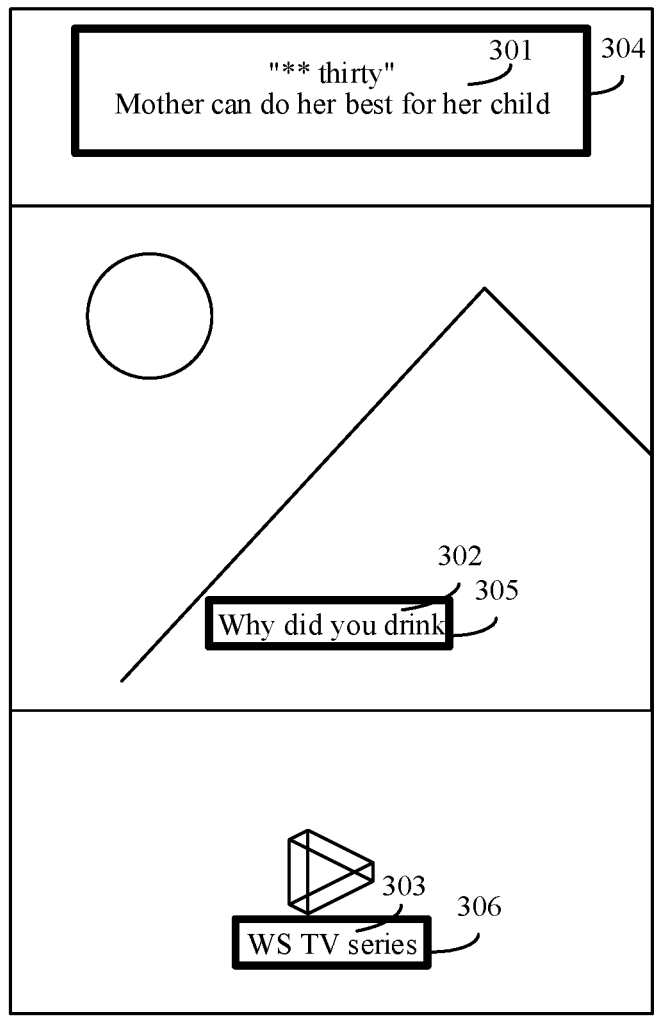
FIG. 7 is a schematic diagram of a video frame image in a method for recognizing a subtitle region according to another exemplary embodiment of this application.

For example, as shown in FIG. 7, in a video frame image of a video, there are three texts displayed: a first text 301, a second text 302, and a third text 303, and the OCR model recognizes the three text and outputs: a candidate text content of the first text 301: "'Thirty**' mother can do her best for her child", and a text region: a left border position x1=2, a right border position x2=8, an upper border position y1=10, and a lower border position y2=8 of a first text box 304; a candidate text content of the second text 302: "Why did you drink?", and a text region: a left border position x3=3, a right border position x4=7, an upper border position y3=6, and a lower border position y4=5 of a second text box 305; and a candidate text content of the third text 303: "WS TV series", and a text region: a left border position x5=4, a right border position x6=6, an upper border position y5=3, and a lower border position y6=2 of a third text box 306.

Exemplarily, a video frame image corresponds to a display time in a video. When capturing video frame images, the video frame images are stored in chronological order, and corresponding display times of the video frame images in the video are stored. For example, a video frame at is in the video is captured to obtain a video frame image at 1 s, and the video frame image is stored corresponding to the video frame at 1 s.

Therefore, the candidate text contents recognized from each video frame image may also correspond to the display time of the video frame image in the video. For a candidate text content, subsequent video frame images may be sequentially searched to find out whether there are candidate text contents that are the same as the candidate text content and have same text regions. If there are, the candidate text contents are determined as the same text content, and display durations of the text contents can be obtained according to a display times corresponding to the video frame images when the candidate text content appears for the first time and a display time corresponding to the video frame images when the candidate text content appears for the last time. Exemplarily, such search is continuous, and when the candidate text content is not found in a next frame of video frame image, the search is stopped. That is, a plurality of candidate text contents that are consecutive in time, in same text regions, and have the same candidate text content are combined into one text content.

For example, as shown in Table 1, after text recognition of an OCR model, seven candidate text contents are recognized from a total of seven video frame images from 1 s to 7 s. A first "ni hao" appears in a text region at (1, 1), and (2, 2) from is to 4 s, then four candidate text contents "ni hao" are determined as a same text content, and according to that "ni hao" appears at a first time 1 s and a last time 4 s, a display duration of the text content may be calculated as 3 s; and similarly, a display duration of a second "ni hao" can be obtained as 1 s, a candidate text content that is displayed on only one video frame image is directly used as the text content, and a display duration may be set to a time interval of capturing video frame images, for example: 1 s. Therefore, after combining the candidate text contents, text contents shown in Table 2 may be obtained.

TABLE 1

| Candidate text content | Text region | Time |
|---|---|---|
| Ni hao | (1, 1), (2, 2) | 1 s |
| Ni hao | (1, 1), (2, 2) | 2 s |
| Ni hao | (1, 1), (2, 2) | 3 s |
| Ni hao | (1, 1), (2, 2) | 4 s |
| hi | (1, 1), (2, 2) | 5 s |
| Ni hao | (1, 1), (2, 2) | 6 s |
| Ni hao | (1, 1), (2, 2) | 7 s |

TABLE 2

| Text content | Text region | Display duration |
|---|---|---|
| Ni hao | (1, 1), (2, 2) | 3 s |
| hi | (1, 1), (2, 2) | 1 s |
| Ni hao | (1, 1), (2, 2) | 1 s |

Exemplarily, a text list includes at least one piece of text data of at least one text content, and one text content corresponds to one text region, and corresponds to one display duration.

Exemplarily, the display duration in the text list also needs to include a start time and an end time of the display, that is, the start time and the end time are stored as the display duration, and the display duration may be calculated according to the start time and the end time. For example, after obtaining a video, a computer device generates a video link from the video, and then recognizes texts in the video to obtain a text list shown in Table 3. The text region is described by using a left edge x1, a right edge x2, an upper edge y1, and a lower edge y2 of a rectangle, and the display duration is described by using a start time "startTime" and an end time "endTime".

TABLE 3

| Video link | Text content | Display duration | Text region |
|---|---|---|---|
| http://ceph-med001 | 1 | [{"startTime":"0.1" "endTime":"0.5"}] | <x1>466</x1><y1>459</y1> <x2>466</x2><y2>459</y2> |
| http://ceph-med001 | 2 | [{"startTime":"0.1" "endTime":"0.6"}] | <x1>467</x1><y1>460</y1> <x2>567</x2><y2>560</y2> |
| http://ceph-med001 | 1 | [{"startTime":"0.2" "endTime":"0.6"}] | <x1>468</x1><y1>461</y1> <x2>568</x2><y2>561</y2> |

TABLE 3-continued

| Video link | Text content | Display duration | Text region |
|---|---|---|---|
| http://ceph-med001 | 3 | [{"startTime":"0.7" "endTime":"1"}] | <x1>469</x1><y1>462</y1> <x2>569</x2><y2>562</y2> |

Step 2021: Select a text region from m text regions corresponding to m text contents as a first text region, determine the first text region as a first candidate subtitle region, and add the first candidate subtitle region to a candidate subtitle region list.

Step 2022: Cyclically perform the step 2022 and a step 2023 until all the m text regions are selected: select a text region from the remaining (m−k+1) text regions as a $k^{th}$ text region.

Step 2023: Determine whether a position deviation between the $k^{th}$ text region and a candidate subtitle region is greater than a deviation threshold, when the position deviation is greater than (or equal to) the deviation threshold, perform a step 2025, and when the position deviation is less than (or equal to) the deviation threshold, perform a step 2024.

Step 2024: Classify, in response to a first position deviation between the $k^{th}$ text region and a $w^{th}$ candidate subtitle region in the candidate subtitle region list being less than the deviation threshold, the $k^{th}$ text region into the $w^{th}$ candidate subtitle region.

Exemplarily, after classifying the $k^{th}$ text region into the $w^{th}$ candidate subtitle region, a first height of the $k^{th}$ text region is calculated, the first height being a difference between an upper edge and a lower edge of the $k^{th}$ text region;

a second height of the $w^{th}$ candidate subtitle region is calculated, the second height being a difference between an upper edge and a lower edge of the $w^{th}$ candidate subtitle region; and in response to the first height being greater than the second height, the $k^{th}$ text region is determined as the $w^{th}$ candidate subtitle region, where k is a positive integer less than or equal to m, w is a positive integer less than or equal to n, and n and m are positive integers.

Step 2025: Determine, in response to second position deviations between the $k^{th}$ text region and all candidate subtitle regions in the candidate subtitle region list being greater than the deviation threshold, the $k^{th}$ text region as a $y^{th}$ candidate subtitle region, and add the $y^{th}$ candidate subtitle region to the candidate subtitle region list.

The first position deviation includes a difference between two upper edges and a difference between two lower edges, each second position deviation includes a difference between two upper edges or a difference between two lower edges, y is a positive integer less than or equal to n, k is a positive integer less than or equal to m, w is a positive integer less than or equal to n, and m and n are positive integers.

Exemplarily, the steps 2021 to 2025 are method steps of grouping text regions to obtain candidate subtitle regions, which use an example in which m pieces of text data are included in a text list, and the text regions are described by using positions of upper edges and lower edges of rectangles.

Exemplarily, according to an arrangement order (which may be in any order) of text data in a text list, a first text region may be read in sequence, the first text region may be directly used as a candidate subtitle region and placed in a candidate subtitle region list, then, starting from a second text region, a comparison is made to an existing candidate subtitle region in the candidate subtitle region list, to see if a second text region can match the existing candidate subtitle region (a difference between upper edges of the two regions needs to be less than a deviation threshold and a deviation between lower edges also needs to be less than the deviation threshold), and when there are matching candidate subtitle regions, the text region is assigned to the candidate subtitle region; when there are no matching candidate subtitle regions, the text region is then stored as a new candidate subtitle region in the candidate subtitle region list; and in this way, each text region in the text list is involved, and the candidate subtitle regions stored in the candidate subtitle region list are obtained.

Exemplarily, one candidate subtitle region may include a plurality of text regions, but there is only one region position (including upper edge and lower edge) of the candidate subtitle region, and the region position of the candidate subtitle region is a text region (upper edge and lower edge) with a highest height among the text regions belonging to the candidate subtitle region.

Therefore, after one text region is assigned to a candidate subtitle region, it is necessary to determine whether a height of a newly added text region is greater than a height of a current region position of the candidate subtitle region. When the height of the newly added text region is greater, the region position of the candidate subtitle region is updated to the newly added text region. When a height difference of the newly added text region is less than the current region position of the candidate subtitle region, the current region position of the candidate subtitle region is kept unchanged.

Figure 8:
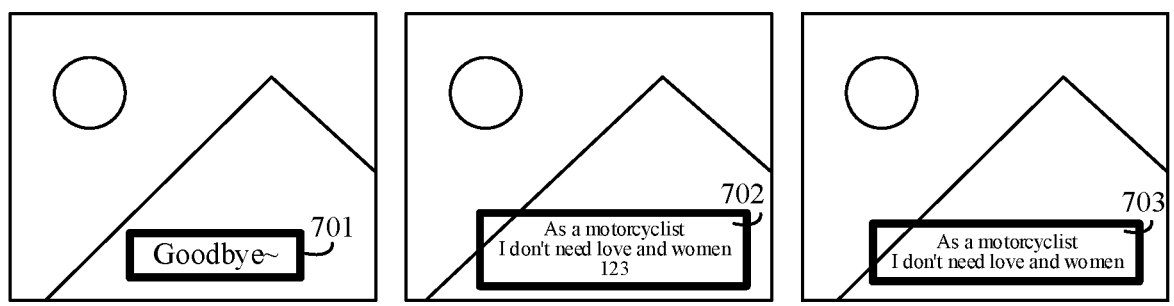
FIG. 8 is a schematic diagram of a text region in a method for recognizing a subtitle region according to another exemplary embodiment of this application.

Exemplarily, in another implementation, a height difference of each text region is first calculated, then text regions are sorted according to height differences in ascending order to obtain a text region sequence list, and candidate subtitle regions are read and determined according to an order of the text region order list, starting from a first text region. In this way, the problem that the determined subtitle regions are inaccurate can be resolved. For example, as shown in FIG. 8, taking a first text region 701, a second text region 702, and a third text region 703 as examples, the first text region 701 is smaller than the third text region 703 and smaller than the second text region 702, a position deviation between the first text region 701 and the second text region 702 is greater than a deviation threshold, a position deviation between the second text region 702 and the third text region 703 is less than the deviation threshold, and a position deviation between the first text region 701 and the third text region 703 is less than the deviation threshold. When text regions are extracted in an order of the first text region 701, the second text region 702, and the third text region 703, then, when the second text region 702 is extracted, because the position deviation between the second text region 702 and the first text region 701 is greater than the deviation threshold, the second text region 702 is used as a new candidate subtitle region, resulting in an inaccurate recognition result of the candidate subtitle region. However, when the text regions are sorted according to height differences, the third text region 703 is extracted first after the first text region 701 is extracted, the position deviation between the third text region 703 and the first text region 701 is less than the deviation threshold, and a height difference of the third text region 703 is greater than that of the first text region 701. Then, a region position of the candidate subtitle region is updated to the third text region 703. Subsequently, when the second text region 702 is extracted again, because the position deviation between the second text region 702 and the third text region 703 is less than the deviation threshold, the second text region 702 is also classified into the candidate subtitle region, and the region position of the candidate subtitle region is updated to the second text region 702.

Exemplarily, due to a customary reading order, most subtitles are horizontal subtitles. The steps 2021 to 2025 use a horizontal subtitle as an example, and use an upper edge and a lower edge as a text region; and similarly, to recognize a vertical subtitle, the upper edge and the lower edge described above are changed to a left edge and a right edge, that is, the text region is the left edge and the right edge.

Step 2031: Calculate a repetition rate of each candidate subtitle region in the n candidate subtitle regions, the repetition rate being used for describing a repetition probability of text contents appearing in the candidate subtitle region.

Exemplarily, the repetition rate is a ratio of a cumulative duration to a total video duration of a video, and the cumulative duration is a sum of display durations of same text contents.

Exemplarily, a method for calculating the repetition rate is provided, including: obtaining a $j^{th}$ group of text contents corresponding to a $j^{th}$ candidate subtitle region, the $j^{th}$ group of text contents including at least one text content corresponding to the $j^{th}$ candidate subtitle region, j being a positive integer less than or equal to n, and n being a positive integer; classifying same text contents in the $j^{th}$ group of text contents into a text content set, to obtain x text content sets in total; calculating a sum of display durations of text contents in each of the text content sets to obtain a cumulative duration and x cumulative durations in total, x being a positive integer; calculating a ratio of a maximum cumulative duration to a total video duration of the video to obtain the repetition rate, the maximum cumulative duration being a maximum value in at least one cumulative duration; and repeating the four operations described above to obtain the repetition rate of each candidate subtitle region.

That is, all text data belonging to the candidate subtitle region are obtained, and then text data with same text contents is combined: reserving one text content, and adding the display durations to obtain the cumulative duration without the need of using a text position, which can be omitted herein; and dividing, when there are no repeated text contents in combined text data, the maximum cumulative duration in the combined text data by the total video duration of the video to obtain the repetition rate.

The repetition rate is a ratio of the cumulative display duration of same text contents displayed in the candidate subtitle regions to the total video duration. When the same text contents are always displayed at one position, then an interference text (video title, watermark, or the like) is likely to be at that position.

Step 2032: Determine candidate subtitle regions in which text contents have a repetition rate being lower than a repetition rate threshold as preliminary screened subtitle regions.

Exemplarily, the repetition rate threshold may be arbitrarily set. Exemplarily, the repetition rate threshold may be 10%.

Exemplarily, a candidate subtitle region with a repetition rate greater than the repetition rate threshold may be a text region in which a watermark is located, a text region in which a video title is located, or a subtitle region in which text contents of another video are fixed and unchanged (with little change).

Step 2033: Calculate a total display duration of each preliminary screened subtitle region.

Exemplarily, a method for calculating the total display duration is provided, including: calculating a sum of display durations of text contents corresponding to the preliminary screened subtitle region, to obtain the total display duration of the preliminary screened subtitle region.

Exemplarily, after preliminary screening of the candidate subtitle regions is performed to obtain the preliminary screened subtitle regions, the total display duration of each preliminary screened subtitle region is calculated, and the total display duration is a total duration of text contents displayed in the preliminary screened subtitle region. In a video, texts may be displayed briefly at some positions. For example, at the beginning of a TV series, a current episode is displayed at a middle position of a screen, or some screens with texts may be briefly captured in the video. Regions in which the texts are located are not subtitle regions because text contents are displayed in a subtitle region for a long time. Therefore, the preliminary screened subtitle region with the longest total display duration among the preliminary screened subtitle regions is used as the subtitle region.

For example, in a first preliminary screened subtitle region, a first text content is displayed for 1 s, a second text content is displayed for 2 s, and a third text content is displayed for 6 s, then a total display duration of the first preliminary screened subtitle region is 1+2+6=9 s.

Step 2034: Determine, in the preliminary screened subtitle regions, a preliminary screened subtitle region with a longest total display duration as the subtitle region.

Exemplarily, certainly, some other subtitle region screening policies may also be adopted to screen subtitle regions.

For example, when candidate subtitle regions are determined according to text regions, a text region in which an inclination angle between upper edges or lower edges of the text region is greater than an angle threshold may be directly removed and not be used a candidate subtitle region. Because a subtitle is usually in regular orientation (horizontal or vertical), text data in irregular orientation may be removed directly.

In another example, because a subtitle is usually in white or black fonts, after a text list is recognized, text data corresponding to text contents displayed in another color may be deleted from the text list, and the subtitle region is recognized by using the deleted text list and the method provided in this application.

Exemplarily, after obtaining a subtitle region of a video, a computer device may recognize a subtitle of the video according to text contents belonging to the subtitle region.

For example, text contents in text data corresponding to the subtitle region are trimmed and used as the subtitle of the video.

Exemplarily, after the subtitle is obtained, a color of the subtitle may also be changed. Because an OCR model can recognize pixels at which text contents are located in image frames when a text list is obtained, then, after obtaining a subtitle according to a subtitle region, colors of the pixels at which the subtitle is located may be changed, so as to automatically recognize the subtitle and quickly edit the subtitle. When a color of the subtitle is similar to that of the video, causing the subtitle to be unclear, the method provided in this embodiment may be adopted to quickly modify the color of the subtitle, so that the subtitle can be distinguished from the overall color of the video, and the definition of the subtitle can be improved.

For example, a computer device receives a color editing instruction, and the color editing instruction is used for indicating a target color; and modifies text contents belonging to the subtitle region with the target color, to generate a target video, a subtitle in the target video being displayed in the target color.

The computer device modifies pixels corresponding to the text contents in the subtitle region in the image frames of the video with the target color.

In the method, after the text contents in the video are recognized, this part of text contents belonging to the subtitle is recognized from the text contents, and the subtitle is edited and processed independently, to quickly edit and process the subtitle without affecting other text contents in the video.

In summary, in the method provided in this embodiment, video frame images of a video are obtained first, then an OCR model is adopted to perform text recognition on the video frame images, and candidate text contents obtained by text recognition are deduplicated to obtain a text list including text contents, so as to extract text data in the video, which facilitates determining a subtitle region according to the text data.

In the method provided in this embodiment, candidate subtitle regions are first obtained according to text regions, and a plurality of text regions obtained through text recognition are grouped to obtain several regions approximate to a subtitle region, which facilitates subsequent recognition of the subtitle region according to a subtitle region recognition policy.

In the method provided in this embodiment, a repetition rate of text contents displayed in each candidate subtitle region is calculated to determine whether the candidate subtitle region is used for displaying a watermark, a video titles, and the like, or is another region with a long display duration and an unchanged display content, and candidate subtitle regions of this type are removed to obtain preliminary screened subtitle regions.

In the method provided in this embodiment, a total display duration of each preliminary screened subtitle region is calculated to remove a region in which text contents are only displayed for a short time from preliminary screened subtitle regions. Because text contents in a subtitle region are usually displayed for a long time, according to this characteristic, a preliminary screened subtitle region with a longest total display duration among the preliminary screened subtitle regions may be determined as the subtitle region.

Exemplarily, an exemplary embodiment of determining the subtitle region in combination with a speech recognition result is provided.

Figure 9:
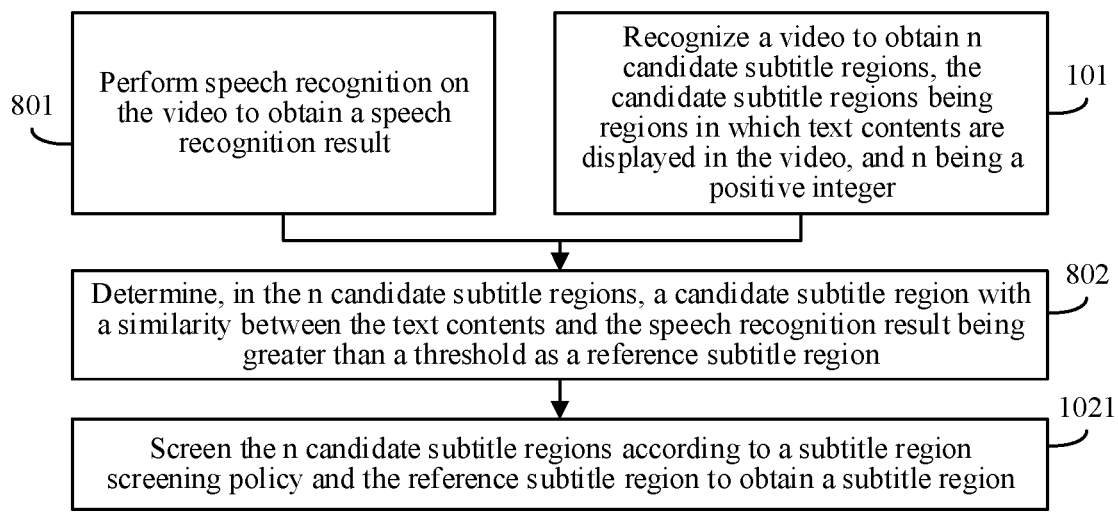
FIG. 9 is a method flowchart of a method for recognizing a subtitle region according to another exemplary embodiment of this application.

FIG. 9 shows a method flowchart of a method for recognizing a subtitle region according to an exemplary embodiment of this application. The method may be performed by a computer device, for example, a terminal or a server as shown in FIG. 1. The method includes the following steps.

Step 101: Recognize a video to obtain n candidate subtitle regions, the candidate subtitle regions being regions in which text contents are displayed in the video, and n being a positive integer.

Step 801: Perform speech recognition on the video to obtain a speech recognition result.

Exemplarily, the speech recognition result is obtained by performing speech recognition on an audio in the video, and the speech recognition result includes at least one recognized text content.

Step 802: Determine, in the n candidate subtitle regions, a candidate subtitle region with a similarity between the text contents and the speech recognition result being greater than a threshold as a reference subtitle region.

Exemplarily, the speech recognition result is compared with the text contents corresponding to each candidate subtitle region, and the similarity is calculated. For example, the similarity is equal to: a ratio of a quantity of same text contents to a total quantity of text contents corresponding to a candidate subtitle region. The same text contents are text contents in the text contents corresponding to the candidate subtitle region that are the same as a text content in the speech recognition result.

Step 1021: Screen the n candidate subtitle regions according to a subtitle region screening policy and the reference subtitle region to obtain a subtitle region;

sort the n candidate subtitle regions according to the subtitle region screening policy to obtain a sorting result; increase a sorting weight of the reference subtitle region, and revise the sorting result based on a sorting weight of the n candidate subtitle regions; and screen the n candidate subtitle regions based on a revised sorting result to obtain the subtitle region.

For example, according to an exemplary embodiment shown in FIG. 6, according to the subtitle region screening policy, total display durations are sorted in descending order, and a sorting result is obtained. Then, a default sorting weight of each candidate subtitle region is 1, a sorting weight of a reference subtitle region is set to 2, the total display durations are weighted to obtain the weighted total display durations, and the weighted total display durations are sorted to obtain a revised sorting result. A candidate subtitle region with a longest total display duration in the revised sorting result is determined as the subtitle region.

In summary, in the method provided in this embodiment, a subtitle region is recognized in combination with a speech recognition result. Because speech contents of a character are usually marked in a subtitle in a video, text contents displayed in a subtitle region usually matches a speech recognition result, and the subtitle region is determined based on the speech recognition result, which can improve the recognition accuracy of the subtitle region.

Exemplarily, an exemplary embodiment of obtaining training samples of a speech-to-text model by using the method provided in this application is provided.

Figure 10:
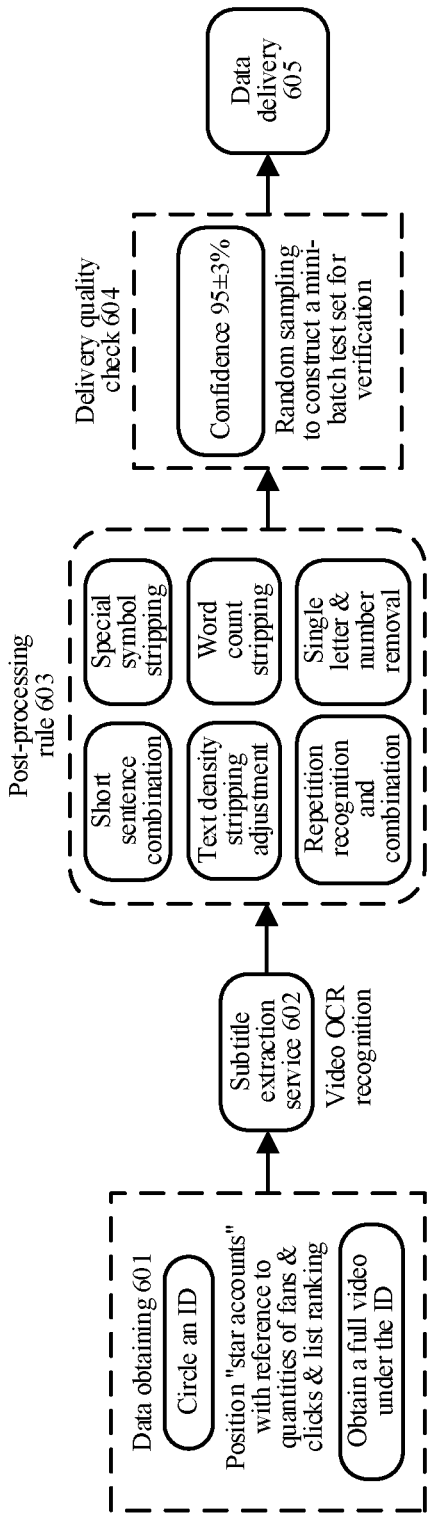
FIG. 10 is a method flowchart of a method for recognizing a subtitle region according to another exemplary embodiment of this application.

FIG. 10 shows a method flowchart of a method for recognizing a subtitle region according to an exemplary embodiment of this application. The method may be performed by a computer device, for example, a terminal or a server as shown in FIG. 1. The method includes the following steps.

Step 601: Obtain, by a computer device, data.

Exemplarily, first, a video of a popular user account in a video application is obtained, where the popular user account is a user account with relatively lots of fans or video clicks, or top few on a rank list. Exemplarily, all videos under such popular accounts are obtained as videos whose subtitle regions are to be recognized.

Step 602: Perform, by the computer device, a subtitle extraction service.

Figure 11:
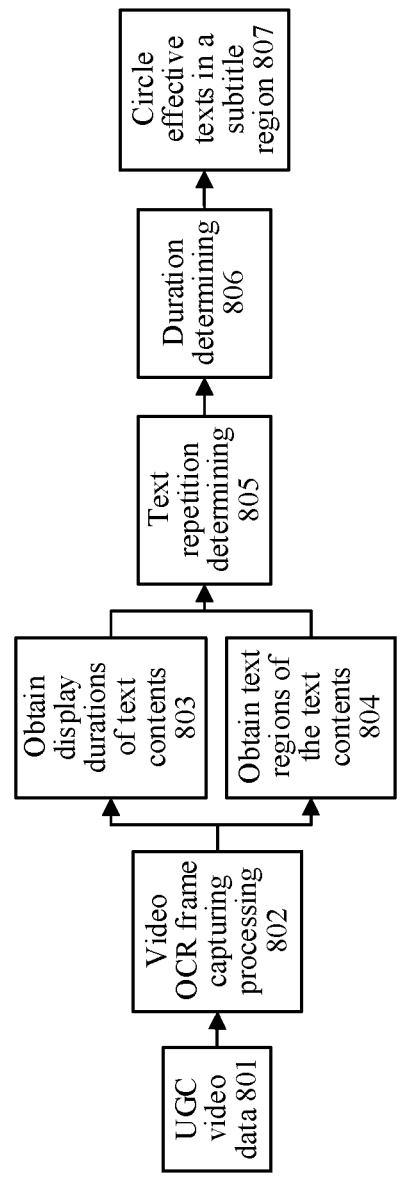
FIG. 11 is a method flowchart of a method for recognizing a subtitle region according to another exemplary embodiment of this application.

Exemplarily, the method for recognizing a subtitle region provided in this application is adopted to recognize the subtitle region in the video. For example, as shown in FIG. 11, video OCR frame capturing processing 802 (capturing video frame images, performing text recognition on the video frame images to obtain recognition results, and deduplicating candidate text contents in the recognition results to obtain a text list) is performed on a user generated content (UGC) to obtain text contents, display durations 803 of the text contents, and text regions 804 in which the text contents are located. Then, the text regions 804 are grouped to obtain a plurality of candidate subtitle regions, a repetition rate of each candidate subtitle region is calculated, text repetition determining 805 is performed to select preliminary screened subtitle regions with a repetition rate less than a repetition rate threshold, then total display durations of the preliminary screened subtitle regions are calculated, and lasting time determining 806 is performed: selecting a preliminary screened subtitle region with a longest total display duration (lasting time) as the subtitle region 807.

Step 603: Perform, by the computer device, post-processing on text contents in a subtitle region.

For example, the post-processing includes at least one of short sentence combination, special symbol stripping, text density stripping, word count stripping, repetition recognition and combination, and single letter and number removal. Exemplarily, the short sentence combination is used for combining super-short sentences (for example: "a", and "hao de") in text contents. The special symbol stripping is used for removing non-text data (for example, emoticons) in text contents. The text density stripping is used for stripping super-long sentences from text contents. The text word count stripping is used for stripping text contents according to a quantity of stripped words, for example, stripping every 2-14 words. The repetition recognition and combination is used for combining data of repeated text contents. The single letter and number removal is used for removing single letters or numbers in another non-target language (for example, Chinese) from text contents.

Step 604: Verify, by the computer device, delivery quality.

Exemplarily, the computer device verifies an automatically recognized subtitle by using a manual marking result of a video subtitle. Exemplarily, obtained subtitle recognition results are sampled and tested, recognition results are randomly selected to construct a test set, and confidence verification is performed. When a confidence is within a range of 95±3%, it is determined that a recognition result is accurate, and the recognition result is subjected to data delivery 605. Text contents in the recognition result and an audio of a corresponding time period in the video are used as the training samples of the speech-to-text model. Exemplarily, the confidence is equal to: a ratio of a quantity of correctly recognized words in a subtitle recognition result to a total quantity of words in the subtitle recognition result.

In summary, in the method provided in this embodiment, by using the method for recognizing a subtitle region provided in this application to recognize a subtitle, subtitle contents in a video can be accurately recognized, then training samples of a speech-to-text model can be obtained according to the recognized subtitle contents and audios of corresponding time periods in the video, and the speech-to-text model is trained based on the subtitle contents and the audios, which can save labor resources in a process of sample obtaining and improve the efficiency of sample obtaining.

Apparatus embodiments of this application are described below. For details that are not described in detail in the apparatus embodiments, reference may be made to the corresponding records in the foregoing method embodiments, and details are not described herein again.

Figure 12:
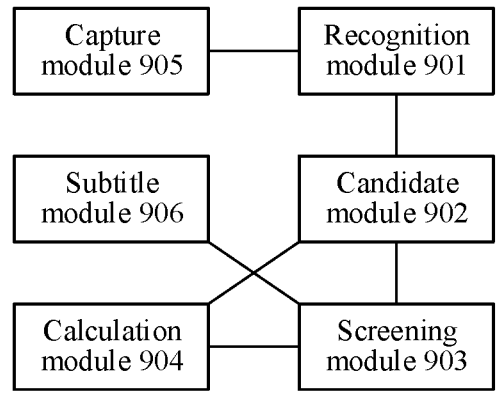
FIG. 12 is a block diagram of an apparatus for recognizing a subtitle region according to another exemplary embodiment of this application.

FIG. 12 shows a schematic structural diagram of an apparatus for recognizing a subtitle region according to an exemplary embodiment of this application. The apparatus may be implemented as an entire computer device or a part of a computer device by using software, hardware, or a combination thereof, including:

a recognition module 901, configured to recognize a video to obtain n candidate subtitle regions, the candidate subtitle regions being regions in which text contents are displayed in the video, and n being a positive integer; and a screening module 903, configured to screen the n candidate subtitle regions according to a subtitle region screening policy to obtain the subtitle region, the subtitle region screening policy being used for determining a candidate subtitle region in which text contents have a repetition rate being lower than a repetition rate threshold and have a longest total display duration as the subtitle region.

In an embodiment, the apparatus further includes:

a calculation module 904, configured to calculate a repetition rate of each candidate subtitle region in the n candidate subtitle regions, the repetition rate being used for describing a repetition probability of text contents appearing in the candidate subtitle region;

the screening module 903, further configured to determine candidate subtitle regions in which text contents have the repetition rate being lower than the repetition rate threshold as preliminary screened subtitle regions;

the calculation module 904, further configured to calculate a total display duration of each preliminary screened subtitle region; and the screening module 903, further configured to determine, in the preliminary screened subtitle regions, a preliminary screened subtitle region with the longest total display duration as the subtitle region.

In an embodiment, the calculation module 904 is further configured to obtain a $j^{th}$ group of text contents corresponding to a $j^{th}$ candidate subtitle region, the $j^{th}$ group of text contents including at least one text content corresponding to the $j^{th}$ candidate subtitle region, j being a positive integer less than or equal to n, and n being a positive integer;

the calculation module 904 is further configured to classify same text contents in the $j^{th}$ group of text contents into a text content set, to obtain x text content sets in total;

the calculation module 904 is further configured to calculate a sum of display durations of text contents in each of the text content sets to obtain a cumulative duration and x cumulative durations in total, x being a positive integer;

the calculation module 904 is further configured to calculate a ratio of a maximum cumulative duration to a total video duration of the video to obtain the repetition rate, the maximum cumulative duration being a maximum value in at least one cumulative duration; and the calculation module 904 is further configured to repeat the four operations described above to obtain the repetition rate of each candidate subtitle region.

In an embodiment, the calculation module 904 is further configured to calculate a sum of display durations of text contents corresponding to the preliminary screened subtitle region, to obtain the total display duration of the preliminary screened subtitle region.

In an embodiment, the apparatus further includes:

a recognition module 901, configured to recognize text contents in the video and text regions in which the text contents are located; and a candidate module 902, configured to cluster, according to a positional relationship of the text regions, text regions with a position deviation less than a deviation threshold into a same candidate subtitle region, to obtain the n candidate subtitle regions in total.

In an embodiment, the text list includes m pieces of text data, the text region includes an upper edge and a lower edge of a rectangle, and m is a positive integer;

the candidate module 902 is further configured to select a text region from m text regions corresponding to the m text contents as a first text region, determine the first text region as a first candidate subtitle region, and add the first candidate subtitle region to a candidate subtitle region list; and the candidate module 902 is further configured to cyclically perform the following steps until all the m text regions are selected: select a text region from the remaining (m−k+1) text regions as a $k^{th}$ text region, and classify, in response to a first position deviation between the $k^{th}$ text region and a $w^{th}$ candidate subtitle region in the candidate subtitle region list being less than the deviation threshold, the $k^{th}$ text region into the $w^{th}$ candidate subtitle region; and determine, in response to second position deviations between the $k^{th}$ text region and all candidate subtitle regions in the candidate subtitle region list being greater than the deviation threshold, the $k^{th}$ text region as a $y^{th}$ candidate subtitle region, and add the $y^{th}$ candidate subtitle region to the candidate subtitle region list, where the first position deviation includes a difference between two upper edges and a difference between two lower edges, each second position deviation includes a difference between two upper edges or a difference between two lower edges, y is a positive integer less than or equal to n, k is a positive integer less than or equal to m, w is a positive integer less than or equal to n, and n is a positive integer.

In an embodiment, the candidate module 902 is further configured to calculate a first height of the $k^{th}$ text region, the first height being a difference between an upper edge and a lower edge of the $k^{th}$ text region; calculate a second height of the $w^{th}$ candidate subtitle region, the second height being a difference between an upper edge and a lower edge of the $w^{th}$ candidate subtitle region; and determine, in response to the first height being greater than the second height, the $k^{th}$ text region as the $w^{th}$ candidate subtitle region, where k is a positive integer less than or equal to m, w is a positive integer less than or equal to n, and n and m are positive integers.

In an embodiment, the recognition module 901 is further configured to recognize the text contents in the video, the text regions in which the text contents are located, and display durations of the text contents.

In an embodiment, the apparatus further includes:

a capture module 905, configured to periodically capture video frame images of the video; and the recognition module 901, further configured to recognize the text contents in the video frame images, the text regions in which the text contents are located, and the display durations of the text contents.

In an embodiment, the recognition module 901 is further configured to call an optical character recognition (OCR) model to recognize the video frame images, to obtain candidate text contents in the video frame images and text regions in which the candidate text contents are located, and obtain display times of the candidate text contents according to display times of the video frame images; and the recognition module 901 is further configured to deduplicate the candidate text contents to obtain the text contents, where the deduplicating includes determining a candidate text content with an earliest display time from a plurality of candidate text contents with continuous display times, same text regions, and same candidate text contents as the text contents, and calculating the display durations of the text contents according to the display times of the plurality of candidate text contents.

In an embodiment, the apparatus further includes:

a subtitle module 906, configured to recognize a subtitle of the video according to the text contents belonging to the subtitle region.

In an embodiment, the apparatus further includes: the subtitle module 906, configured to receive a color editing instruction, the color editing instruction being used for indicating a target color; and the subtitle module 906, configured to modify the text contents belonging to the subtitle region with the target color, to generate a target video, a subtitle in the target video being displayed in the target color.

In an embodiment, the apparatus further includes:

a receiving module, configured to receive a color editing instruction, the color editing instruction being used for indicating a target color; and an editing module, configured to modify the text contents belonging to the subtitle region with the target color, to generate a target video, a subtitle in the target video being displayed in the target color.

In an embodiment, the apparatus further includes:

a speech recognition module, configured to perform speech recognition on the video to obtain a speech recognition result;

a reference module, configured to determine, in the n candidate subtitle regions, a candidate subtitle region with a similarity between the text contents and the speech recognition result being greater than a threshold as a reference subtitle region; and the screening module 903, further configured to screen the n candidate subtitle regions according to the subtitle region screening policy and the reference subtitle region to obtain the subtitle region.

In an embodiment, the screening module 903 is further configured to sort the n candidate subtitle regions according to the subtitle region screening policy to obtain a sorting result;

the screening module 903 is further configured to increase a sorting weight of the reference subtitle region, and revise the sorting result based on a sorting weight of the n candidate subtitle regions; and the screening module 903 is further configured to screen the n candidate subtitle regions based on a revised sorting result to obtain the subtitle region.

Figure 13:
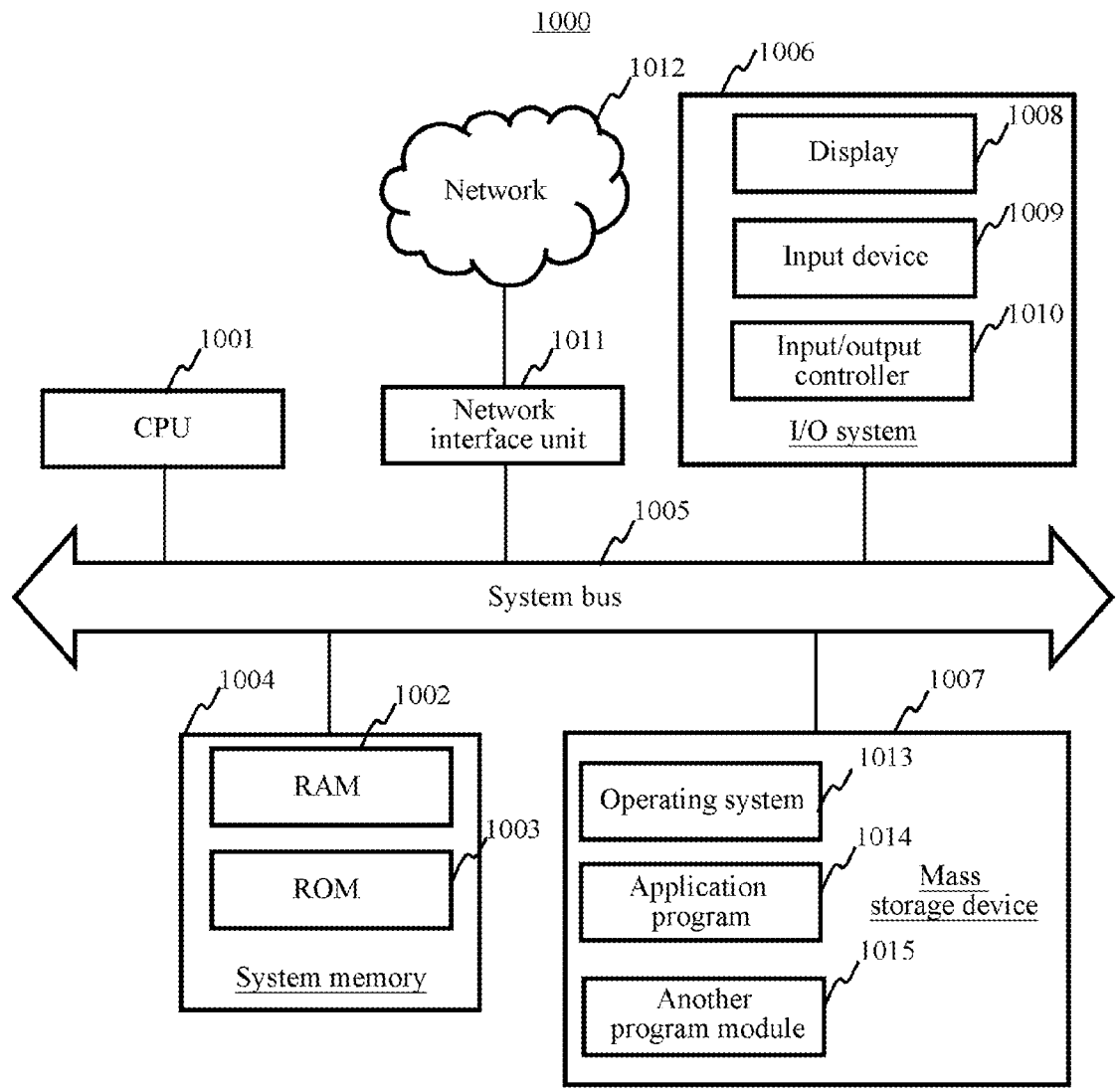
FIG. 13 is a schematic structural diagram of a server according to another exemplary embodiment of this application.

FIG. 13 is a schematic structural diagram of a server according to an embodiment of this application. Specifically: a server 1000 includes a central processing unit (CPU) 1001, a random access memory (RAM) 1002, a system memory 1004 of a read-only memory (ROM) 1003, and a system bus 1005 connecting the system memory 1004 to the CPU 1001. The server 1000 further includes a basic input/output system (I/O system) 1006 assisting in transmitting information between devices in a computer, and a mass storage device 1007 configured to store an operating system 1013, an application program 1014 and another program module 1015.

The basic I/O system 1006 includes a display 1008 configured to display information and an input device 1009 such as a mouse or a keyboard that is used for inputting information by a user. The display 1008 and the input device 1009 are both connected to the CPU 1001 by using an input/output controller 1010 connected to the system bus 1005. The basic I/O system 1006 may further include the input/output controller 1010 to receive and process inputs from a plurality of other devices such as a keyboard, a mouse, and an electronic stylus. Similarly, the input/output controller 1010 further provides an output to a display screen, a printer, or other type of output device.

The mass storage device 1007 is connected to the CPU 1001 by using a mass storage controller (not shown) connected to the system bus 1005. The mass storage device 1007 and a computer readable medium associated with the mass storage device 1007 provide non-volatile storage for the server 1000. That is, the mass storage device 1007 may include a computer-readable medium (not shown) such as a hard disk or a compact disc ROM (CD-ROM) drive.

Generally, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a magnetic cassette, a magnetic tape, a magnetic disk memory, or another magnetic storage device. Certainly, a person skilled in the art may learn that the computer storage medium is not limited to the foregoing types. The system memory 1004 and the mass storage device 1007 described above may be collectively referred to as a memory.

According to various embodiments of this application, the server 1000 may further be connected, by using a network such as the Internet, to a remote computer on the network and run. That is, the server 1000 may be connected to a network 1012 by using a network interface unit 1011 that is connected to the system bus 1005, or may be connected to a network of another type or a remote computer system (not shown) by using the network interface unit 1011.

This application further provides a terminal, the terminal includes a processor and a memory, the memory stores at least one instruction, and the at least one instruction is loaded and executed by the processor to implement the method for recognizing a subtitle region provided in the foregoing method embodiments. The terminal may be a terminal provided in FIG. 14 below.

Figure 14:
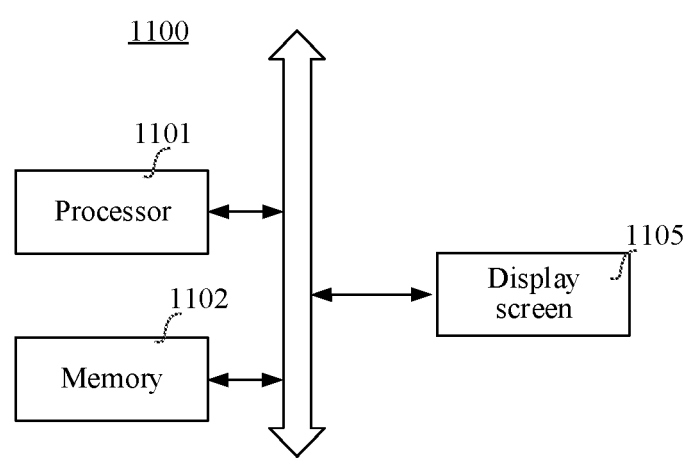
FIG. 14 is a block diagram of a terminal according to another exemplary embodiment of this application.

FIG. 14 is a structural block diagram of a terminal 1100 according to an exemplary embodiment of this application. The terminal 1100 may be: a smartphone, a tablet computer, a Moving Picture Experts Group Audio Layer III (MP3) player, a Moving Picture Experts Group Audio Layer IV (MP4) player, a notebook computer, or a desktop computer. The terminal 1100 may also be referred to other names such as user equipment, a portable terminal, a laptop terminal, or a desktop terminal.

Typically, the terminal 1100 includes: a processor 1101 and a memory 1102.

The processor 1101 may include one or more processing cores. For example, the processor may be a 4-core processor or an 8-core processor. The processor 1101 may be implemented by at least one hardware form of a digital signal processor (DSP), a field-programmable gate array (FPGA), and a programmable logic array (PLA). The processor 1101 may alternatively include a main processor and a coprocessor. The main processor is configured to process data in an active state, also referred to as a central processing unit (CPU). The coprocessor is a low-power processor configured to process data in a standby state. In some embodiments, the processor 1101 may be integrated with a graphics processing unit (GPU). The GPU is configured to be responsible for rendering and drawing content that a display needs to display. In some embodiments, the processor 1101 may further include an artificial intelligence (AI) processor. The AI processor is configured to process computing operations related to machine learning.

The memory 1102 may include one or more computer-readable storage media that may be non-transitory. The memory 1102 may further include a high-speed random access memory (RAM) and a non-volatile memory, such as one or more magnetic disk storage devices or flash storage devices. In some embodiments, the non-transitory computer-readable storage medium in the memory 1102 is configured to store at least one instruction, and the at least one instruction is used for being executed by the processor 1101 to implement the method for recognizing a subtitle region provided in the method embodiments of this application.

The display screen 1105 is configured to display a user interface (UI). The UI may include a graph, a text, an icon, a video, and any combination thereof. When the display screen 1105 is a touch display screen, the display screen 1105 is also capable of collecting a touch signal on or above a surface of the display screen 1105. The touch signal may be used as a control signal to be inputted to the processor 1101 for processing. In this case, the display screen 1105 may further be configured to provide a virtual button and/or a virtual keyboard that are/is also referred to as a soft button and/or a soft keyboard. In some embodiments, there may be one display screen 1105 disposed on a front panel of the terminal 1100; in some other embodiments, there may be at least two display screens 1105 that are respectively disposed on different surfaces of the terminal 1100 or folded; and in still some other embodiments, the display screen 1105 may be a flexible display screen disposed on a curved surface or a folded surface of the terminal 1100. Even, the display screen 1105 may further be set in a non-rectangular irregular pattern, that is, a special-shaped screen. The display screen 1105 may be prepared by using materials such as a liquid crystal display (LCD), an organic light-emitting diode (OLED), or the like.

A person skilled in the art may understand that the structure shown in FIG. 14 does not constitute a limitation to the terminal 1100, and the terminal may include more components or fewer components than those shown in the figure, or some components may be combined, or a different component deployment may be used.

The memory further includes one or more programs. The one or more programs are stored in the memory and include the method for recognizing a subtitle region provided in the embodiments of this application.

This application further provides a computing device, including: a processor and a memory, the storage medium storing at least one instruction, at least one program, a code set, or an instruction set, the at least one instruction, the at least one program, the code set, or the instruction set being loaded and executed by the processor to implement the method for recognizing a subtitle region provided in the foregoing method embodiments.

This application further provides a computer-readable storage medium, storing at least one instruction, at least one program, a code set, or an instruction set, the at least one instruction, the at least one program, the code set, or the instruction set being loaded and executed by a processor to implement the method for recognizing a subtitle region provided in the foregoing method embodiments.

This application further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the method for recognizing a subtitle region provided in the foregoing implementations.

It is to be understood that "plurality of" mentioned in this specification means two or more. "And/or" describes an association relationship for describing associated objects and represents that three relationships may exist. For example, A and/or B may represent the following three cases: only A exists, both A and B exist, and only B exists. The character "/" generally indicates an "or" relationship between the associated objects. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for recognizing a subtitle region in a video performed by a computer device, the method comprising:
   obtaining n candidate subtitle regions in a video, the candidate subtitle regions being regions in which text contents are displayed in the video, and n being a positive integer; and
   screening the n candidate subtitle regions according to a subtitle region screening policy to obtain the subtitle region, the subtitle region screening policy being used for determining a candidate subtitle region in which text contents have a repetition rate being lower than a repetition rate threshold and have a longest total display duration as the subtitle region.

2. The method according to claim 1, wherein the screening the n candidate subtitle regions according to a subtitle region screening policy to obtain the subtitle region comprises:
   calculating a repetition rate of each candidate subtitle region in the n candidate subtitle regions, the repetition rate being used for describing a repetition probability of text contents appearing in the candidate subtitle region;
   determining candidate subtitle regions in which text contents have the repetition rate being lower than the repetition rate threshold as preliminary screened subtitle regions;
   calculating a total display duration of each preliminary screened subtitle region; and
   determining, in the preliminary screened subtitle regions, a preliminary screened subtitle region with the longest total display duration as the subtitle region.

3. The method according to claim 2, wherein the calculating a total display duration of each preliminary screened subtitle region comprises:
   calculating a sum of display durations of text contents corresponding to the preliminary screened subtitle region, to obtain the total display duration of the preliminary screened subtitle region.

4. The method according to claim 1, wherein the obtaining n candidate subtitle regions in a video comprises:
   recognizing text contents in the video and text regions in which the text contents are located; and
   clustering, according to a positional relationship of the text regions, text regions with a position deviation less than a deviation threshold into a same candidate subtitle region, to obtain the n candidate subtitle regions in total.

5. The method according to claim 1, further comprising:
   recognizing a subtitle of the video according to the text contents belonging to the subtitle region.

6. The method according to claim 1, further comprising:
   performing speech recognition on the video to obtain a speech recognition result; and
   determining, in the n candidate subtitle regions, a candidate subtitle region with a similarity between the text contents and the speech recognition result being greater than a threshold as a reference subtitle region, wherein
   the screening the n candidate subtitle regions according to a subtitle region screening policy to obtain the subtitle region comprises:
   screening the n candidate subtitle regions according to the subtitle region screening policy and the reference subtitle region to obtain the subtitle region.

7. The method according to claim 6, wherein the screening the n candidate subtitle regions according to the subtitle region screening policy and the reference subtitle region to obtain the subtitle region comprises:
   sorting the n candidate subtitle regions according to the subtitle region screening policy to obtain a sorting result;
   increasing a sorting weight of the reference subtitle region, and revising the sorting result based on a sorting weight of the n candidate subtitle regions; and
   screening the n candidate subtitle regions based on a revised sorting result to obtain the subtitle region.

8. A computer device, comprising: a processor and a memory storing at least one instruction, the at least one instruction being loaded and executed by the processor to and causing the computer device to implement a method for recognizing a subtitle region in a video, the method including:

obtaining n candidate subtitle regions in a video, the candidate subtitle regions being regions in which text contents are displayed in the video, and n being a positive integer; and screening the n candidate subtitle regions according to a subtitle region screening policy to obtain the subtitle region, the subtitle region screening policy being used for determining a candidate subtitle region in which text contents have a repetition rate being lower than a repetition rate threshold and have a longest total display duration as the subtitle region.

9. The computer device according to claim 8, wherein the screening the n candidate subtitle regions according to a subtitle region screening policy to obtain the subtitle region comprises:

calculating a repetition rate of each candidate subtitle region in the n candidate subtitle regions, the repetition rate being used for describing a repetition probability of text contents appearing in the candidate subtitle region;

determining candidate subtitle regions in which text contents have the repetition rate being lower than the repetition rate threshold as preliminary screened subtitle regions;

calculating a total display duration of each preliminary screened subtitle region; and determining, in the preliminary screened subtitle regions, a preliminary screened subtitle region with the longest total display duration as the subtitle region.

10. The computer device according to claim 9, wherein the calculating a total display duration of each preliminary screened subtitle region comprises:

calculating a sum of display durations of text contents corresponding to the preliminary screened subtitle region, to obtain the total display duration of the preliminary screened subtitle region.

11. The computer device according to claim 8, wherein the obtaining n candidate subtitle regions in a video comprises:

recognizing text contents in the video and text regions in which the text contents are located; and clustering, according to a positional relationship of the text regions, text regions with a position deviation less than a deviation threshold into a same candidate subtitle region, to obtain the n candidate subtitle regions in total.

12. The computer device according to claim 8, wherein the method further comprises:

recognizing a subtitle of the video according to the text contents belonging to the subtitle region.

13. The computer device according to claim 8, wherein the method further comprises:

performing speech recognition on the video to obtain a speech recognition result; and determining, in the n candidate subtitle regions, a candidate subtitle region with a similarity between the text contents and the speech recognition result being greater than a threshold as a reference subtitle region, wherein the screening the n candidate subtitle regions according to a subtitle region screening policy to obtain the subtitle region comprises:

screening the n candidate subtitle regions according to the subtitle region screening policy and the reference subtitle region to obtain the subtitle region.

14. The computer device according to claim 13, wherein the screening the n candidate subtitle regions according to the subtitle region screening policy and the reference subtitle region to obtain the subtitle region comprises:

sorting the n candidate subtitle regions according to the subtitle region screening policy to obtain a sorting result;

increasing a sorting weight of the reference subtitle region, and revising the sorting result based on a sorting weight of the n candidate subtitle regions; and screening the n candidate subtitle regions based on a revised sorting result to obtain the subtitle region.

15. A non-transitory computer-readable storage medium, storing at least one instruction, the at least one instruction being loaded and executed by a processor of a computer device and causing the computer device to implement a method for recognizing a subtitle region in a video, the method including:

obtaining n candidate subtitle regions in a video, the candidate subtitle regions being regions in which text contents are displayed in the video, and n being a positive integer; and screening the n candidate subtitle regions according to a subtitle region screening policy to obtain the subtitle region, the subtitle region screening policy being used for determining a candidate subtitle region in which text contents have a repetition rate being lower than a repetition rate threshold and have a longest total display duration as the subtitle region.

16. The non-transitory computer-readable storage medium according to claim 15, wherein the screening the n candidate subtitle regions according to a subtitle region screening policy to obtain the subtitle region comprises:

calculating a repetition rate of each candidate subtitle region in the n candidate subtitle regions, the repetition rate being used for describing a repetition probability of text contents appearing in the candidate subtitle region;

determining candidate subtitle regions in which text contents have the repetition rate being lower than the repetition rate threshold as preliminary screened subtitle regions;

calculating a total display duration of each preliminary screened subtitle region; and determining, in the preliminary screened subtitle regions, a preliminary screened subtitle region with the longest total display duration as the subtitle region.

17. The non-transitory computer-readable storage medium according to claim 16, wherein the calculating a total display duration of each preliminary screened subtitle region comprises:

calculating a sum of display durations of text contents corresponding to the preliminary screened subtitle region, to obtain the total display duration of the preliminary screened subtitle region.

18. The non-transitory computer-readable storage medium according to claim 15, wherein the obtaining n candidate subtitle regions in a video comprises:

recognizing text contents in the video and text regions in which the text contents are located; and clustering, according to a positional relationship of the text regions, text regions with a position deviation less than a deviation threshold into a same candidate subtitle region, to obtain the n candidate subtitle regions in total.

19. The non-transitory computer-readable storage medium according to claim 15, wherein the method further comprises:

recognizing a subtitle of the video according to the text contents belonging to the subtitle region.

20. The non-transitory computer-readable storage medium according to claim 15, wherein the method further comprises:
performing speech recognition on the video to obtain a speech recognition result; and
determining, in the n candidate subtitle regions, a candidate subtitle region with a similarity between the text contents and the speech recognition result being greater than a threshold as a reference subtitle region, wherein
the screening the n candidate subtitle regions according to a subtitle region screening policy to obtain the subtitle region comprises:
screening the n candidate subtitle regions according to the subtitle region screening policy and the reference subtitle region to obtain the subtitle region.

* * * * *